United States Patent
Ulupinar et al.

(10) Patent No.: US 9,071,414 B2
(45) Date of Patent: Jun. 30, 2015

(54) METHOD AND APPARATUS FOR DISTINGUISHING BROADCAST MESSAGES IN WIRELESS SIGNALS

(75) Inventors: Fatih Ulupinar, San Diego, CA (US); Parag Arun Agashe, San Diego, CA (US); Sandip Sarkar, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1134 days.

(21) Appl. No.: 12/052,536

(22) Filed: Mar. 20, 2008

(65) Prior Publication Data

US 2008/0232294 A1  Sep. 25, 2008

Related U.S. Application Data

(60) Provisional application No. 60/896,736, filed on Mar. 23, 2007.

(51) Int. Cl.
*H04H 20/71* (2008.01)
*H04B 7/204* (2006.01)
*H04B 7/212* (2006.01)
*H04B 7/208* (2006.01)
*H04L 5/02* (2006.01)
*H04L 5/00* (2006.01)
(Continued)

(52) U.S. Cl.
CPC .............. *H04L 5/023* (2013.01); *H04L 1/0003* (2013.01); *H04L 1/0009* (2013.01); *H04L 1/0057* (2013.01); *H04L 5/0003* (2013.01); *H04L 5/0053* (2013.01); *H04L 27/2647* (2013.01)

(58) Field of Classification Search
CPC .................. H04L 1/0057; H04L 27/2647
USPC .................... 370/312, 319, 324, 344
See application file for complete search history.

(56) References Cited

U.S. PATENT DOCUMENTS

| | | |
|---|---|---|
| 6,157,815 A | 12/2000 | Collins et al. |
| 6,621,851 B1 * | 9/2003 | Agee et al. .................... 375/130 |
| 6,795,427 B1 | 9/2004 | Klein et al. |

(Continued)

FOREIGN PATENT DOCUMENTS

| | | |
|---|---|---|
| CN | 1620766 A | 5/2005 |
| EP | 1414177 A1 | 4/2004 |

(Continued)

OTHER PUBLICATIONS

Partial International Search Report—PCT/US2008/058071, International Search Authority—European Patent Office—May 1, 2009.

(Continued)

*Primary Examiner* — Shripal Khajuria
*Assistant Examiner* — Farhad Ali
(74) *Attorney, Agent, or Firm* — John J. Ketchum

(57) ABSTRACT

Methods and apparatus for processing and generating broadcast messages determined by a subband and OFDM symbols of frames in which signals are received. Overhead messages indicating resources used by broadcast messages in a wireless communication system are generated. Signals are received over a wireless system and broadcast messages are determined from the signals as designated by a subband and OFDM symbols of frames of an ultraframe in which signals are received.

23 Claims, 6 Drawing Sheets

Indexing BCMCS Subbands

(51) Int. Cl.
*H04L 27/26* (2006.01)
*H04L 1/00* (2006.01)

(56) References Cited

U.S. PATENT DOCUMENTS

| | | | | |
|---|---|---|---|---|
| 2004/0027999 | A1 | 2/2004 | Casaccia et al. | |
| 2004/0105402 | A1* | 6/2004 | Yi et al. | 370/312 |
| 2007/0011555 | A1* | 1/2007 | Kim et al. | 714/749 |
| 2007/0053282 | A1 | 3/2007 | Tong et al. | |
| 2007/0217370 | A1* | 9/2007 | Soong et al. | 370/337 |
| 2008/0025337 | A1* | 1/2008 | Smith et al. | 370/439 |
| 2008/0084818 | A1* | 4/2008 | Yoon et al. | 370/210 |

FOREIGN PATENT DOCUMENTS

| | | |
|---|---|---|
| EP | 1471683 | 10/2004 |
| EP | 1542388 A1 | 6/2005 |
| EP | 1566936 A1 | 8/2005 |
| EP | 1667340 A1 | 6/2006 |
| EP | 1764934 A2 | 3/2007 |
| GB | 2327567 | 1/1999 |
| JP | 2007507159 A | 3/2007 |
| RU | 2110159 | 4/1998 |
| RU | 2235430 | 8/2004 |
| WO | WO-2004017540 A1 | 2/2004 |
| WO | 2005043829 | 5/2005 |
| WO | WO2005122458 | 12/2005 |
| WO | 2006039812 | 4/2006 |
| WO | WO2006047942 A1 | 5/2006 |
| WO | WO2006069301 | 6/2006 |
| WO | 2006093379 | 9/2006 |
| WO | 2006138556 | 12/2006 |
| WO | WO2006134449 A2 | 12/2006 |
| WO | WO2006135221 A1 | 12/2006 |
| WO | WO-2006138566 A2 | 12/2006 |
| WO | 2007024073 | 3/2007 |

OTHER PUBLICATIONS

International Search Report—PCT/US2008/058071, International Search Authority—European Patent Office—Dec. 3, 2009.
Written Opinion—PCT/US2008/058071, International Search Authority—European Patent Office—Dec. 3, 2009.
Taiwan Search Report—TW097110413—TIPO—Sep. 1, 2012.
Schmidl T.M., et al., "Robust Frequency and Timing Synchronization for OFDM", IEEE Transactions on Communications, Dec. 1997, vol. 45, No. 12, pp. 1613-1621.

\* cited by examiner

Indexing BCMCS Subbands

Error Control Block Structure

METHOD AND APPARATUS FOR DISTINGUISHING BROADCAST MESSAGES IN WIRELESS SIGNALS

CLAIM OF PRIORITY UNDER 35 U.S.C. §119

This application claims priority to U.S. Provisional Application No. 60/896,736, filed Mar. 23, 2007 entitled "Broadcast Medium Access Control for Wireless Communication Systems."

BACKGROUND

1. Field

The present disclosure relates generally to wireless communications, and amongst other things to signal acquisition for wireless communication systems.

2. Background

Wireless communication systems have become a prevalent means by which a majority of people worldwide have come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

Wireless communication systems generally utilize different approaches to generate transmission resources in the form of channels. These systems may be code division multiplexing (CDM) systems, frequency division multiplexing (FDM) systems, and time division multiplexing (TDM) systems. One commonly utilized variant of FDM is orthogonal frequency division multiplexing (OFDM) that effectively partitions the overall system bandwidth into multiple orthogonal subcarriers. These subcarriers may also be referred to as tones, bins, and frequency channels. Each subcarrier can be modulated with data. With time division based techniques, each subcarrier can comprise a portion of sequential time slices or time slots. Each user may be provided with a one or more time slot and subcarrier combinations for transmitting and receiving information in a defined burst period or frame. Such "hopping" schemes may generally be a symbol rate hopping scheme or a block hopping scheme.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band portion of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and/or code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams transmitted from the base station. Likewise, a mobile terminal can transmit data to the base station or another mobile terminal. In these systems the bandwidth and other system resources are assigned utilizing a scheduler.

Generally, a wireless multiple-access communication system can simultaneously support communication for multiple wireless terminals. Each terminal communicates with one or more base stations via transmissions on the forward link (FL) and reverse link (RL). The forward link (or downlink DL) refers to the communication link from the base stations to the terminals, and the reverse link (or uplink UL) refers to the communication link from the terminals to the base stations. This communication link may be established via a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

For FDMA based systems, two kinds of scheduling techniques are typically employed: subband scheduling and diversity scheduling. In subband scheduling user packets are mapped to tone allocations that are confined to a narrow bandwidth. Subband scheduling may also be referred to as frequency selective scheduling (FSS). In contrast, in diversity scheduling the user packets are mapped to tone allocations that span the entire system bandwidth. Diversity scheduling may also be referred to as frequency hopped scheduling (FHS). Frequency hopping is typically employed to achieve both channel and interference diversity. Therefore, it may be desirable to perform frequency hopping within a subband with frequency selective scheduling in a broadcast or multicast environment.

SUMMARY

Methods and apparatus for processing and generating broadcast messages determined by a subband and OFDM symbols of frames in which signals are received. Embodiments include method, apparatus and processor-readable medium for processing broadcast messages received over a wireless channel. A plurality of signals are received and broadcast messages are determined from the signals as designated by a subband and OFDM symbols of frames of an ultraframe in which signals are received.

Another embodiment includes a method of processing broadcast messages for transmission over a wireless channel including filling data into error control blocks in a row basis. Reed-Solomon coding is applied along columns of the error control blocks and the filled and coded error control blocks are transmitted.

A further embodiment includes a method of generating one or more messages indicating resources used by broadcast messages in a wireless communication system. The method includes generating an overhead message comprising a MessageID field identifying the message, a signature field identifying a broadcast channel information message, a number of logical channels identifying a number of logical channels used to transmit broadcast overhead messages, and a duration field indicative of a number of subbands occupied but broadcast messages. The overhead message is then transmitted.

A yet further embodiment includes an apparatus for processing broadcast messages received over a wireless channel. The apparatus includes a receiver configured to receive a plurality of signals and a processor configured to determine which of the signals corresponds to at least one broadcast message designated by a subband and OFDM symbols of frames of an ultraframe in which signals are received.

DETAILED DESCRIPTION

Figure 1:
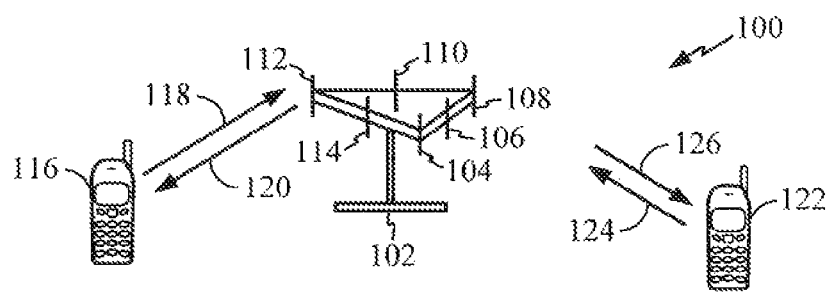
FIG. 1 illustrates a multiple access wireless communication system according to an embodiment.

The word "exemplary" is used herein to mean "serving as an example, instance, or illustration." Any embodiment described herein as "exemplary" is not necessarily to be construed as preferred or advantageous over other embodiments.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Referring to FIG. 1, a multiple access wireless communication 100 system according to one embodiment is illustrated. An access point 102 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequencies for communication. For example, forward link 120 may use a different frequency than that used by reverse link 118.

Each group of antennas and/or the area in which they are designed to communicate may be referred to as a sector of the access point. In an embodiment, antenna groups each are designed to communicate to access terminals in a sector, of the areas covered by access point 102.

In communication over forward links 120 and 126, the transmitting antennas of access point 102 utilize beamforming in order to improve the signal-to-noise ratio of forward links for the access terminals 116 and 122. An access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other similar terminology. An access terminal may also be called an access terminal, user equipment (UE), a wireless communication device, terminal, access terminal or some other similar terminology.

Figure 2:
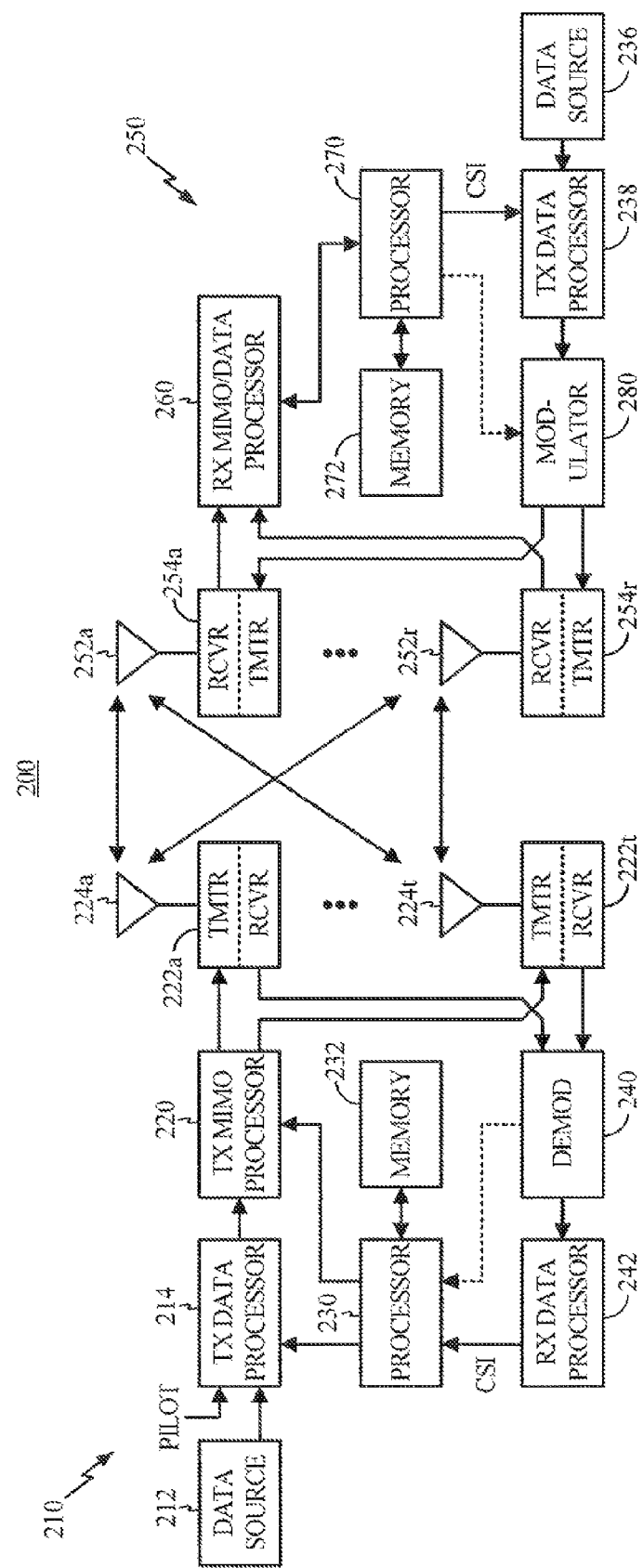
FIG. 2 is a block diagram of a communication system according to an embodiment.

FIG. 2 is a block diagram of a MIMO system 200 including an embodiment of a transmitter system 210 (also known as the access point) and a receiver system 250 (also known as access terminal). At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream and to provide coded data.

The coded data for each data stream may be multiplexed with pilot data using OFDM techniques. The pilot data typically is a known data pattern that is processed in a known manner and may be used at the receiver system to estimate the channel response. The multiplexed pilot and coded data for each data stream are then modulated (i.e., symbol mapped) based on the modulation scheme (e.g., BPSK, QSPK, M-PSK, or M-QAM) selected for that data stream to provide modulation symbols. The data rate, coding, and modulation for each data stream may be determined by instructions performed by processor 230. Instructions may be stored in memory 232.

The modulation symbols for all data streams are then provided to a TX MIMO processor 220, which may further process the modulation symbols depending on the modulation scheme (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. The $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210. Instructions may be stored in memory 272.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

RX data processor 260 may be limited in the number of subcarriers that it may simultaneously demodulate, e.g., 512 subcarriers or 5 MHz, and such a receiver should be scheduled on a single carrier. This limitation may be a function of its FFT range, e.g., sample rates at which the processor 260 may operate, the memory available for FFT, or other functions available for demodulation. Further, the greater the number of subcarriers utilized, the greater the expense of the access terminal.

The channel response estimate generated by RX processor 260 may be used to perform space, space/time processing at the receiver, adjust power levels, change modulation rates or schemes, or other actions. RX processor 260 may further estimate the signal-to-noise-and-interference ratios (SNRs) of the detected symbol streams, and possibly other channel characteristics, and provides these quantities to a processor 270. RX data processor 260 or processor 270 may further derive an estimate of the "operating" SNR for the system. Processor 270 then provides channel state information (CSI), which may comprise various types of information regarding the communication link and/or the received data stream. For example, the CSI may comprise only the operating SNR. The CSI is then processed by a TX data processor 238, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to recover the CSI reported by the receiver system. The reported CSI is then provided to processor 230 and used to (1) determine the data rates and coding and modulation schemes to be used for the data streams and (2) generate various controls for TX data processor 214 and TX processor 220. Alternatively, the CSI may be utilized by processor 270 to determine modulation schemes and/or coding rates for transmission, along with other information. This may then be provided to the transmitter which uses this information, which may be quantized, to provide later transmissions to the receiver.

Processors 230 and 270 direct the operation at the transmitter and receiver systems, respectively. Memories 232 and 272 provide storage mediums for processor-executable program codes and data used by processors 230 and 270, respectively.

At the receiver, various processing techniques may be used to process the $N_R$ received signals to detect the $N_T$ transmitted symbol streams. These receiver processing techniques may be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

While FIG. 2 discusses a MIMO system, the same system may be applied to a multi-input single-output system where multiple transmit antennas, e.g., those on a base station, transmit one or more symbol streams to a single antenna device, e.g., a mobile station. Also, a single output to single input antenna system may be utilized in the same manner as described with respect to FIG. 2.

The symbol streams are then transmitted and received over channels. In an aspect, logical channels are classified into Control Channels and Traffic Channels. Logical Control Channels comprises Broadcast Control Channel (BCCH) which is a downlink (DL) channel for broadcasting system control information. Paging Control Channel (PCCH) which is a DL channel that transfers paging information. Multicast Control Channel (MCCH) which is Point-to-multipoint DL channel used for transmitting Multimedia Broadcast and Multicast Service (MBMS) scheduling and control information for one or several Multicast Traffic Channels (MTCH). Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) is used for transmitting traffic data over a Point-to-multipoint DL channel.

In an aspect, Transport Channels are classified into downlink DL and uplink UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to physical layer resources which can be used for other control/traffic channels. The UL Transport Channels comprises a Random Access Channel (RACH), a Request Channel (REQCH), a Uplink Shared Data Channel (UL-SDCH) and plurality of physical layer channels. The physical layer channels comprises a set of DL channels and UL channels.

The downlink physical channels include the following channels: Common Pilot Channel (CPICH); Synchronization Channel (SCH); Common Control Channel (CCCH); Shared Downlink (DL) Control Channel (SDCCH); Multicast Control Channel (MCCH), Shared Uplink (UL) Assignment Channel (SUACH); Acknowledgement Channel (ACKCH); Downlink (DL) Physical Shared Data Channel (DL-PSDCH); Uplink (UL) Power Control Channel (UPCCH); Paging Indicator Channel (PICH); and Load Indicator Channel (LICH).

The Uplink (UL) Physical Channels include the following: Physical Random Access Channel (PRACH); Channel Quality Indicator Channel (CQICH); Acknowledgement Channel (ACKCH); Antenna Subset Indicator Channel (ASICH); Shared Request Channel (SREQCH); Uplink (UL) Physical Shared Data Channel (UL-PSDCH); and Broadband Pilot Channel (BPICH).

According to an aspect, the present disclosure provides Broadcast-MultiCast Services (BCMCS) in a high data rate network. BCMCS is the short form of Broadcast and Multicast Service over an IP network. This Service may allow users to receive a variety of content (e.g., video/text) on their handsets over cellular links using an Ultra Mobile Broadband system. Certain aspects of the present disclosure are discussed in more detail in the following paragraphs.

Specific services such as BCMCS provide point-to-multipoint communication service in a wireless communication system to a plurality of mobile stations that receive the broadcast data through a wireless communication medium operating as a broadcast packet data system. The broadcast data (i.e., content) transmitted by the wireless communication system to the plurality of mobile stations may include, but need not necessarily be limited to, news, movies, sporting events, and the like. The specific type of content transmitted to the mobile stations may include a wide array of multi-media data, such as text, audio, picture, streaming video, etc. The content is typically generated by a content provider and is broadcast to the mobile stations that subscribe to the particular service over a broadcast channel of the wireless communication system.

The broadcast packet data system provides a packet stream that can be used to carry higher layer packets from the access network to multiple access terminals. Various channels provide support for implementation of the BCMC service including a Forward Broadcast and Multicast Services Channel which further includes broadcast physical channels, broadcast logical channels.

Figure 3:
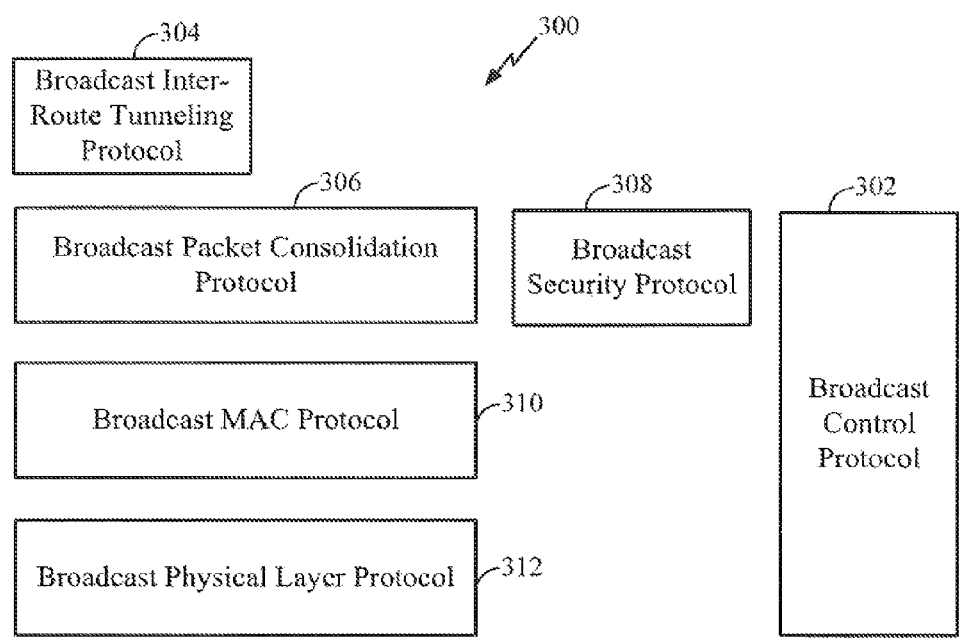
FIG. 3 is a block diagram of an exemplary broadcast protocol structure according to an embodiment.

The Forward Broadcast and Multicast Services Channel carries packets containing content generated by a content server. The Forward Broadcast and Multicast Services Channel can carry forward link signaling messages generated by the broadcast protocol structure of FIG. 3. FIG. 3 illustrates a block diagram of a basic broadcast protocol suite or structure 300, in accordance with various embodiments. Generally, the broadcast protocols may include:

Broadcast Control Protocol 302: The Broadcast Control Protocol defines procedures used to control various aspects of the operation of the broadcast packet data system, such as BCMCS Flow registration requirements. The Broadcast Control Protocol also defines a Broadcast Parameters message.

Broadcast Inter-Route Tunneling Protocol 304: The Broadcast Inter-Route Tunneling Protocol performs tunneling of packets generated by the unicast Routes on the Broadcast Physical Channel.

Broadcast Packet Consolidation Protocol (PCP) 306: The Broadcast Packet Consolidation Protocol performs framing of higher layer packets and multiplexes higher layer packets and signaling messages.

Broadcast Security Protocol 308: The Broadcast Security Protocol provides encryption of Broadcast Packet Consolidation Protocol payload.

Broadcast MAC Protocol 310: The Broadcast MAC Protocol defines procedures used to transmit via the Forward Broadcast and Multicast Services Channel. The Broadcast MAC Protocol also provides Forward Error Correction (FEC) and multiplexing to reduce the radio link error rate as seen by the higher layers.

Broadcast Physical Layer Protocol 312: The Broadcast Physical Layer Protocol provides the channel structure for the Forward Broadcast and Multicast Services Channel.

The Forward Broadcast and Multicast Services Channel can also carry payload from other routes. The Forward Broadcast and Multicast Services Channel has a forward link, but does not have a reverse link. Forward link messages may be sent for transmission directly on the Forward Broadcast and Multicast Services Channel or are tunneled through an Inter-Route Tunneling Protocol of a unicast route. Reverse link messages may be tunneled through the Inter-Route Tunneling Protocol of a unicast route. The Forward Broadcast and Multicast Services Channel consists of Broadcast Physical Channels and Broadcast Logical Channels. Broadcast-Multicast Flows (also called BCMCS Flows) as well as the signaling messages destined to the Forward Broadcast and Multicast Services Channel are associated with Broadcast Logical Channels and are transmitted over Broadcast Physical Channels.

The Broadcast Physical Channels consist of several sub-channels called interlace-multiplex pairs. The structure of the interlace-multiplex pairs may be different across sectors. The Broadcast MAC Protocol and the Broadcast Physical Layer Protocol describe the structure of Broadcast Physical Channels.

A Broadcast Logical Channel (also called a logical channel) refers to a set of one or more interlace-multiplex pairs of the Broadcast Physical Channel associated with a sector over which broadcast content is transmitted. Each logical channel carries one or more BCMCS Flows. An interlace-multiplex pair associated with a sector can be assigned to at most one logical channel.

A logical channel is identified by a pair of the form (sector, BCIndex) where a sector is identified by the pair (SectorId, BCMCS Channel). BCMCS Channel refers to the frequency assignment associated with a single Channel. BCIndex refers to the value corresponding to the first physical layer frame, among the set of all physical layer frames of the set of interlace-multiplex pairs associated with the logical channel, which occurs on or after frame index zero.

A Broadcast-Multicast Service Flow identifier (BCMCS-FlowID) identifies a Broadcast-Multicast flow (also called a BCMCS Flow). The content of a given BCMCS Flow may change with time. A BCMCS Flow is analogous to a single multimedia flow. The contents of a BCMCS Flow are not divided across multiple logical channels.

As stated, the Broadcast MAC Protocol 310 contains the rules governing the operation and the timing of the Forward Broadcast and Multicast Services Channel. The Broadcast MAC Protocol 310 receives Broadcast Packet Consolidation Protocol (PCP) packets from the Broadcast Security Protocol 308. Each packet received from the Broadcast Security Protocol 308 is destined for one Broadcast Logical Channel. The Broadcast MAC Protocol 310 forms an error control block by adding, for example, an outer Reed-Solomon code to the payload destined for the logical channel. The Broadcast MAC Protocol 310 thus reduces the radio link error rate as seen by the higher layers.

Broadcast flows may be mapped to a BCMCS logic channel. The BCMCS logic channel may be transmitted on an aggregation of Broadcast Physical Channels. Each of the aggregation of Broadcast Physical Channels may be uniquely characterized by a SIMT (Sub-band-Interlace-Multiplex Triple). Broadcast multicast system (BCMCS) transmissions are indexed in units of ultraframes. Each ultraframe consists of a number of subzones and interlaces of 48 physical layer superframes.

Information about the physical location of logical channels can be obtained, for example, from an associated Broadcast Overhead Channel. Up to four, for example, Broadcast Overhead Channels are allowed per ultraframe as specified herein by the variable NumBOC. The set of Physical channels that each Broadcast Overhead Channel addresses is denoted by a PhysicalChannelGroupi, where i can take on values from 0 to 3. The Broadcast Overhead Channels transmitted on ultraframe k can contain information about the logical channels transmitted on ultraframe k+1. Each PhysicalChannelGroupi can be partitioned into NumOuterframesPerUltraframei outerframes, where NumOuterframesPerUltraframei=1, 2, 4, or 8. Each logical channel in an ultraframe can be transmitted once every outerframe associated with the PhysicalChannelGroupi.

Regarding subband indexing, each 128 hop ports of a Physical Layer frame that is part of the Broadcast and Multicast services is referred to as a BCMCS subband herein. The location of these BCMCS subbands is advertised. Note that some of these hop ports may map to guard carriers, and hence not be usable for data transmission. In each ultraframe, the BCMCS subbands are indexed by UltraframeResourcesIndex are numbered from 0 to NumResourcesPerUltraframe−1. The physical layer frames on which BCMCS is permitted can be numbered in increasing order with the physical layer frame that occurs earlier in time being numbered lower. If more than one BCMCS subband is present in a physical layer frame, then each subband is numbered in increasing order.

Figure 4:
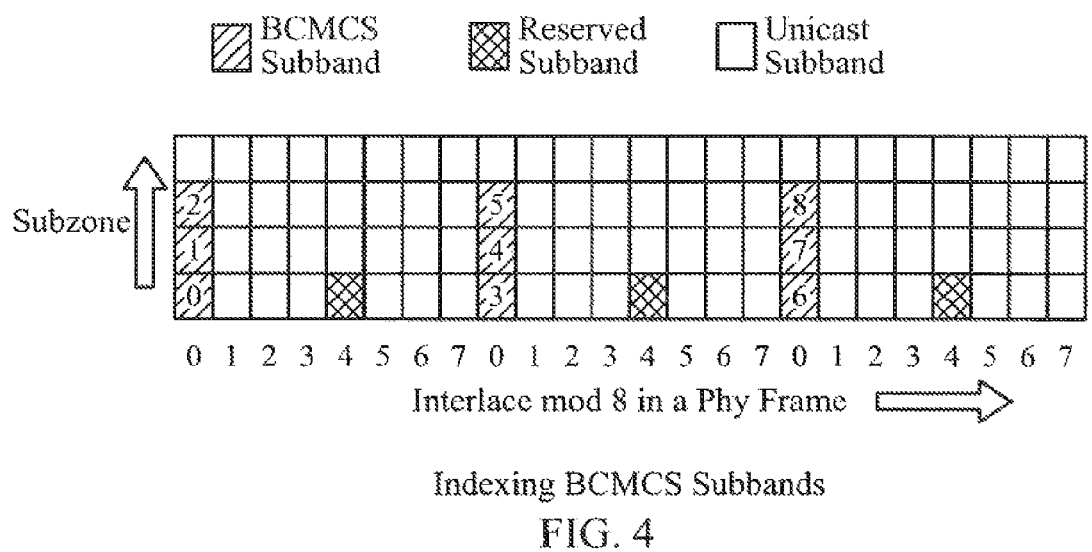
FIG. 4 is a diagram of indexing BCMCS subbands according to an embodiment.

As an example, consider a 5 MHz deployment with each resource being 128 hop ports and one interlace, represented as a box in FIG. 4. The reserved subbands are represented by hashed boxes, while the BCMCS subbands are hashed boxes with an index. This index is referred to as the UltraframeResourcesIndex. In FIG. 4, four subbands are illustrated as being reserved per eight interlaces, of which three are assigned to BCMCS.

Figure 5:
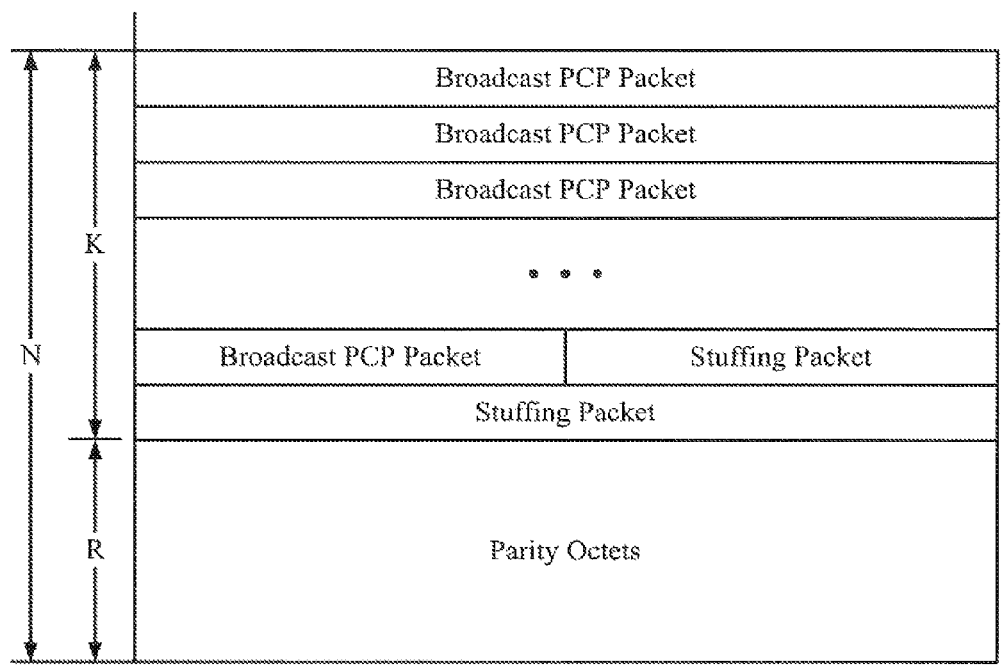
FIG. 5 illustrates an error control block structure of outer-code according to an embodiment.

The outer Reed-Solomon code uses an error control block structure as shown in FIG. 5. An error control block is formed of N rows and MACPacketSize columns. The top K rows of the error control block contain payload from the served protocols, some of which may be stuffing packets. The bottom R=N−K rows of the error control block contain Reed-Solomon parity octets.

The payload packets on the Broadcast Logical Channel (BLC) are protected by the outercode and it is possible for each block of BLC data to have an outercode. In operation, the outer control code, described above, has a span of S ultraframes of BLC with a BOC period, N, where S is a multiple of N. The ECB of the BLC is formed from a sequence of S consecutive ultraframes, for UF t, where t mod S=0. If N∣S, the parameters of the traffic broadcast overhead channel (BOC) change on the ECB boundaries.

A sequence of BPC packets (or erasures) on the BLC over S ultraframes is written row-wise into a matrix of R rows and C columns. Any missing entries are filled with all zero packets. For best diversity, the ultraframe hard decisions should all be buffered. Each submatrix of R rows×1 byte is equal to the received codeword of (R, k) Reed-Solomon code and is compatible with an enhanced broadcast multicast service.

The time span of the error correction block is as follows. The minimum switching time for broadcast logical channel is proportional to the span of the ECB, which is S ultraframes. The smaller the value of S, the faster the switch may take place. Over a longer period of time the data rate of the broadcast logical channel approximates the average rate. If the broadcast logical channel is fixed for longer periods of time, overhead may be improved. S also increases the Reed-Solomon code, increasing diversity. For non-streaming applications, longer error correction blocks are needed. While for streaming applications, shorter error correction blocks may be used in order to achieve better switching times.

Each row of the error control block forms the payload for Broadcast MAC packets for a given logical channel, which is transmitted in Broadcast Physical Layer packets assigned to the logical channel in time order at the start of transmission of the Broadcast Physical Layer packets. In effect, the error control block is a matrix of R rows and C columns where R=1, 16, or 32. R and C are attributes of the BLC and are signaled in the broadcast channel information message described in greater detail below. Row width is determined by the sequence of the payload packets transmitted on the extended channel BCMCS (ECB).

The access network adds stuffing packets to the Broadcast PCP packets if needed to make the payload equal to K rows. These packets contain an all zero payload and are not passed to the physical layer, and thus, are not transmitted over the air.

Error control blocks are generated as described in the following paragraphs. The access network segments the transmission on a logical channel into error control blocks (ECB). Each error control block can begin with zero or one MAC packet received by the BCMCS MAC.

The access network then fills data into the error control block in rows. The access network applies Reed-Solomon coding along columns of the error control block. The access network transmits the error control block on the Forward Broadcast and Multicast Services Channel in rows. Each Error Control block contains N rows and MACPacketSize columns. The top K rows of the error control block can contain payload from the served protocols or stuffing packets. The bottom R=N−K rows of the error control block can contain Reed-Solomon parity octets. The length of each Reed-Solomon code word can be N octets. Each error control block can consist of one Reed-Solomon code word.

The Reed-Solomon code is specified as a (N, K, R) code. N, K and R are defined as follows:
1. N=Number of octets in a Reed-Solomon code word. The value of N can be as defined in C.S0084-1, Physical Layer for Ultra Mobile Broadband (UMB) Air Interface Specification, incorporated herein by reference.
2. K=Number of data octets in a Reed-Solomon code word. The value of K can be as defined in C.S0084-1, Physical Layer for Ultra Mobile Broadband (UMB) Air Interface Specification, incorporated herein by reference.
3. R=N−K=Number of parity octets in a Reed-Solomon code word. The value of R can be as defined in C.S0084-1, Physical Layer for Ultra Mobile Broadband (UMB) Air Interface Specification, incorporated herein by reference.

Each row of the error control block can form the payload for one or more Broadcast MAC packets. A logical channel can use error control blocks with the same values of N, K, and MACPacketSize on all sectors that the access terminal is allowed to soft combine the logical channel.

Data from the error control blocks is transmitted using Broadcast MAC packets. Each row of an error control block is carried using MACPacketSize-bit Broadcast MAC packets. Stuffing packet(s) may be appended to make the number of data packets equal to K if not enough data is available to fill up the K rows as described below. The protocol data unit (PDU) for this protocol is a Broadcast MAC packet.

Regarding the Broadcast Multicast transmission structure, the BCMCS transmissions are indexed in terms of ultraframes. Each ultraframe, for example, consists of a number of subzones and interlaces of, for example, forty-eight, or other numbers of Physical Layer super-frames.

Regarding the indexing of physical resources, each PhysicalChannelGroupi is specified by a number of BCMCS subbands NumOuterframeSubbandsi, where NumOuterframeSubbandsi is a multiple of NumOuterframesPerUltraframei, and i can take on values from 0 to 3. NumPhysicalResourcesi is defined to be the integer defined by NumOuterframeSubbandsi/NumOuterframesPerUltraframei. These BCMCS subbands per Physical Layer group are, for example, numbered sequentially (in increasing order of the BCMCS subband number) from 0 to NumPhysicalResourcesi−1 for each of the PhysicalChannelGroupi corresponding to each outerframe belonging to the PhysicalChannelGroupi. The pair (OuterframeIndexi, PhysicalResourceIndexi) thus has a one-to-one mapping with UltraframeResourcesIndex. Each such BCMCS subband is denoted as NumOuterframeSubbandsi is chosen to be a multiple of NumOuterframesPerUltraframei.

Each PhysicalChannelGroupi, the BCMCS resources assigned to each outerframe are determined by the following pair(s): Offsetj and Periodj. Let k denote the index of BCMCS subband in an outerframe. Every BCMCS subband such that k≡Offsetj (mod Periodj) can be part of PhysicalChannelGroupi. Note that a PhysicalChannelGroupi can consist of a number of such (Offsetj, Periodj) pairs as defined by NumOffsetsPerGroupi for j=0, 1, . . . , 15. Note that this can lead to certain unused BCMCS subbands at the end of the superframe, as NumPhysicalResourcesi is a multiple of Periodj. Further note that a given (Offsetj, Periodj) pair can belong to multiple Physical Channel Groups. In this case, the Broadcast Overhead Message of multiple Physical layer Groups can address the same logical channel. This scenario is useful when the single frequency network (SFN) coverage of the logical channel is different from the SFN coverage of the Broadcast Overhead Channel.

Regarding indexing physical resources, each Forward Broadcast and Multicast Services Channel consists of a number of Physical Layer resources, consisting of a number of subbands as specified in the BroadcastChannelInfo message and mapped to logical channels as described herein. Note that if a logical channel is mapped to the first BCMCS subband of an outerframe, then the logical channel can start at the end of the Broadcast Overhead Channel Message, which may occupy one or two OFDM symbols. For all other BCMS subbands, the logical channel occupies all the OFDM symbols.

A logical channel can carry Broadcast PCP packets from one or more BCMCS Flows. While the same BCMCS Flow may be transmitted independently on several logical channels, the contents of a given BCMCS Flow are not to be split across multiple logical channels. If a BCMCS Flow is carried on more than one logical channel belonging to different sectors, the BCMCS Flow to physical channel mapping need not be the same on all those sectors. Logical channels carrying the same broadcast content may be transmitted synchronously across multiple sectors to facilitate soft combining. A logical channel associated with the Forward Broadcast and Multicast Services Channel may be transmitted synchronously across multiple sectors.

Regarding the Broadcast Overhead Channel, each sector of an access network can carry up to, for example, a maximum of four Broadcast Overhead Channels as defined by the NumBOC parameter. The Broadcast Overhead Channel is sent on the last one, two, four or eight OFDM symbols of each outerframe of a PhysicalChannelGroup.

The modulation parameters of the Broadcast Overhead Channel are carried in the BroadcastChannelInfo message. In addition to the Broadcast Overhead Channel, each logical channel also carries in band information about its location in the next ultraframe. Furthermore, in order for the access terminal to discover and monitor broadcast content successfully, various broadcast-related parameters need to be signaled over the air interface. The access network broadcasts these parameters over one or more information packets of a Control Channel in the form of BroadcastChannelInfo message. The BroadcastChannelInfo message transmitted by a sector contains the logical to physical channel mapping information for that sector. The access network can transmit the BroadcastChannelInfo message with the broadcast MACID as a unicast message over every superframe j such that j mod $N_{BCIPeriod} = N_{BCIPeriod}-1$ (wherein $N_{BCIPeriod}$ is the period of repetition of the BroadcastChannelInfo message (in units if superframe) and may have a constant value, for example, of 240). The location of this message is, for example, between the physical layer Frames 2 and 7 inclusive of the corresponding superframe.

Accordingly, each row of the error control block forms the payload for one or more Broadcast MAC packets. Furthermore, a logical channel can use error control blocks with the same values of N, K, and MACPacketSize on all sectors that the access terminal is allowed to soft combine the logical channel.

The access network adds stuffing packets to Broadcast PCP packets if necessary to make the payload equal to K rows as described above. These packets contain an all zero payload and are not to be passed to the Physical layer, and hence not transmitted over the air.

Each row of the error control block forms the payload for Broadcast MAC packets for a given logical channel, which are transmitted in Broadcast Physical Layer packets assigned to the logical channel in time order of the start of transmission of the Broadcast Physical Layer packets.

Regarding transmission formats, for each Broadcast Physical Layer packet, the Broadcast MAC Protocol provides a transmission format to the Broadcast Physical Layer Protocol. A transmission format defines a set of parameters of a Broadcast Physical Layer packet. The access network assigns a transmission format to each logical channel. For all Broadcast Physical Layer packets associated with a given logical channel, the access network uses the transmission format that is associated with that logical channel. The transmission format of a Broadcast Physical Layer packet may be of one of the following two types; namely the Broadcast Overhead Channel Transmission, or the Broadcast Transmission Formats The Broadcast Overhead Message transmitted on the Forward Broadcast and Multicast Services Channel is associated with the transmission format of the Broadcast Overhead Message. A logical channel transmitted on the Forward Broadcast and Multicast Services Channel is associated with the broadcast transmission format. A basic broadcast transmission format is identified by its packet format index. Each packet format index corresponds to a packet size, rate set, radio configuration, and modulation order.

An example of the transmission formats for the Broadcast Overhead Channel are shown in Table 1. The spectral efficiencies correspond to the number of outerframes per ultraframe. The modulation order is 2 in all cases. Note, for example, that the number of OFDM symbols (NumOFDMSymbolsPerBOC) required for the transmission of the Broadcast Overhead Channel can be found by NumOFDMSymbolsPerBOC=Packet Size/99.

TABLE 1

Broadcast Overhead Channel Transmission Formats

| Packet Format Index | Packet Size | Rate Set | Radio Configuration | Spectral Efficiency (per outerframes in an ultraframe) | | | |
|---|---|---|---|---|---|---|---|
| | | | | 1 | 2 | 4 | 8 |
| 0 | 99  | 1/2/3/4 | 1 | 1.021 | 0.510 | 0.255 | 0.128 |
| 1 | 99  | 1/2/3/4 | 2 | 0.421 | 0.211 | 0.105 | 0.053 |
| 2 | 198 | 1/2/3/4 | 1 | 1.021 | 0.510 | 0.255 | 0.128 |
| 3 | 198 | 1/2/3/4 | 2 | 0.421 | 0.211 | 0.105 | 0.053 |
| 4 | 495 | 1/2/3/4 | 1 | 1.021 | 0.510 | 0.255 | 0.128 |
| 5 | 495 | 1/2/3/4 | 2 | 0.421 | 0.211 | 0.105 | 0.053 |
| 6 | 792 | 1/2/3/4 | 1 | 1.021 | 0.510 | 0.255 | 0.128 |
| 7 | 792 | 1/2/3/4 | 2 | 0.421 | 0.211 | 0.105 | 0.053 |

Regarding physical resources, for BCMCS data, the number of bits (including PAD and FCS bits) carried by a Broadcast Physical Layer packet is called its Packet Size and denoted by $N_{data}$. The Span of a packet is defined to be the number of transmissions that are allowed for the packet. A Rate Set within a given Transmission Mode is defined by two parameters: The BCMCS subband configuration of the first BCMCS subband of a packet and the packet size. A broadcast transmission format, also called the BCMCS Transmission Format, is defined by a Packet Format Index and the number of transmissions. Within each transmission mode, there are, for example, four rate sets referred to as Rate Sets 1, 2, 3, 4. Each rate set contains two Radio Configurations in addition to the unicast numerology, which can be used for the third transmission. In this case, the first and second transmissions are sent using broadcast numerology, while the third transmission occurs with unicast numerology.

The Transmission Formats are shown in Table 2. Two BCMCS Transmission Formats are rate-compatible if and only if they have the same packet format index, but have possibly different Spans. The packet format consists of four bits. These four bits index the spectral efficiency and the modulation format to be used for each HARQ transmission of a data packet. Note that the default maximum number of transmissions is three (in this case, the Span is three), however a sector can choose to transmit once or twice as well for each packet format index. In this case, its Span is set to one or two respectively.

The packet size for each assignment is computed based on the spectral efficiency listed in the table below and the assignment size. The packet size is also given in Table 2.

TABLE 2

Broadcast Transmission Formats

| Packet Format Index | Packet Size | Rate Set | Radio Configuration | Modulation Order | Spectral Efficiency for each Transmission | | |
|---|---|---|---|---|---|---|---|
| | | | | | 1 | 2 | 3 |
| 0  | 1536 | 1 | 1 | 4 | 2.26 | 1.13 | 0.72 |
| 1  | 768  | 1 | 1 | 2 | 1.13 | 0.57 | 0.36 |
| 2  | 2048 | 2 | 1 | 4 | 3.02 | 1.51 | 0.96 |
| 3  | 1024 | 2 | 1 | 2 | 1.51 | 0.75 | 0.75 |
| 4  | 2560 | 3 | 1 | 4 | 1.89 | 1.26 | 0.91 |
| 5  | 1280 | 3 | 1 | 2 | 0.94 | 0.63 | 0.46 |
| 6  | 3568 | 4 | 1 | 4 | 2.64 | 1.76 | 1.27 |
| 7  | 1784 | 4 | 1 | 2 | 1.32 | 0.88 | 0.64 |
| 8  | 768  | 1 | 2 | 4 | 2.18 | 1.09 | 0.70 |
| 9  | 384  | 1 | 2 | 2 | 1.09 | 0.54 | 0.35 |
| 10 | 1024 | 2 | 2 | 4 | 2.90 | 1.45 | 0.94 |
| 11 | 512  | 2 | 2 | 2 | 1.45 | 0.73 | 0.47 |
| 12 | 1280 | 3 | 2 | 4 | 1.82 | 1.21 | 0.89 |
| 13 | 640  | 3 | 2 | 2 | 0.91 | 0.61 | 0.44 |
| 14 | 1792 | 4 | 2 | 4 | 2.54 | 1.69 | 1.24 |
| 15 | 896  | 4 | 2 | 2 | 1.27 | 0.85 | 0.62 |

Regarding Forward Broadcast and Multicast Services Channel Transmission from Multiple Sectors, the Forward Broadcast and Multicast Services Channel is particularly suitable for a single frequency network (SFN) transmissions in which all sectors in a given broadcast coverage area synchronize their broadcast transmissions and transmit the same waveform (with the exception of sector-dependent delay and complex gain) over the air during the time intervals allocated to the Broadcast Physical Layer packets. At the access terminal's antenna, all transmissions that arrive from the participating sectors combine to appear as a single transmission that goes through a multipath channel with possibly large delay spread between the first and the last arriving paths.

Furthermore, the access network may be configured so that adjacent sectors broadcasting the same content on the same resources may use transmission formats with different spans as long as the transmission formats are rate-compatible with one another. As in the SFN transmission, the transmission time of the first BCMCS subband of each packet are synchronized across all sectors transmitting the same content. The BroadcastChannelInfo message transmitted by a sector specifies the transmission format of the corresponding logical channel.

Figure 6:
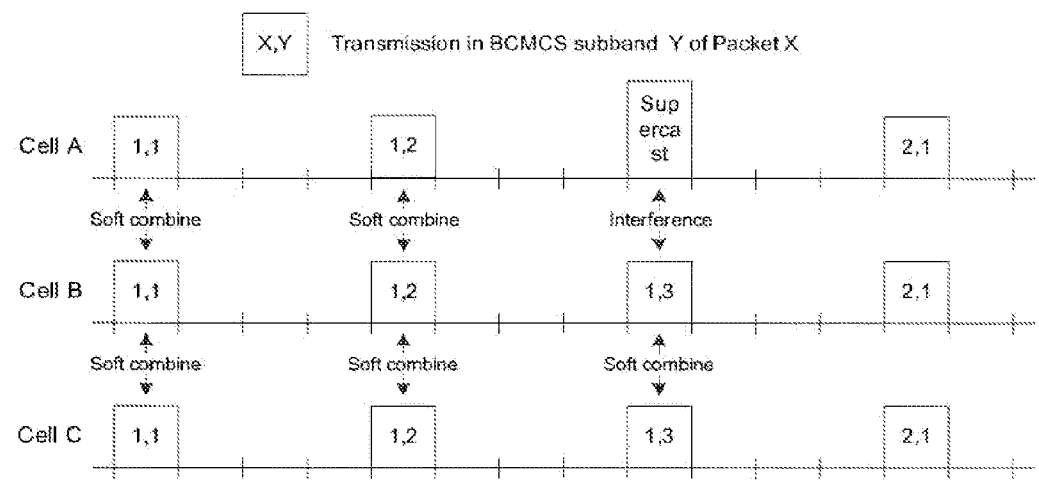
FIG. 6 illustrates a variable rate transmission scheme in accordance with an embodiment.

FIG. 6 illustrates a variable rate transmission scheme in accordance with an embodiment. FIG. 6 shows the rate compatible transmission scheme, in which Cell A uses a transmission format with a span of 2 BCMCS subbands, while cells B and C use a rate-compatible transmission format with a span of 3 BCMCS subbands. Cell A may choose to transmit a supercast packet in the free slot as illustrated in FIG. 6.

The access network can determine the values of the following parameters for each logical channel transmitted on the Forward Broadcast and Multicast Services Channel:

Period: The Period parameter assigned to a logical channel is greater than or equal to the Span of the transmission format of that logical channel. If the Period is greater than the Span of a Packet Format Index, the access network can wait until the next period to transmit the next BCMCS packet. The access network may use this available slot(s) for supercast transmissions as illustrated in FIG. 6.

FDSSeed: Frequency-domain spreading seed. A 10-bit binary number used in frequency-domain spreading.

PilotStagger: A parameter used in pilot tone insertion. PilotStagger is a content dependent parameter: For different contents broadcast at the same time, the access network should assign different values for the PilotStagger parameter.

Pilot-to-Data Power Ratios: Defined below.

Modulation Layer This parameter specifies whether the logical channel is transmitted on the base layer or the enhancement layer if hierarchical modulation is supported.

For every Broadcast Physical Layer packet, the Broadcast MAC Protocol can provide the values of the following parameters to the Broadcast Physical Layer Protocol:

FDSSeed of the logical channel served by the Broadcast Physical Layer packet.

PilotStagger of the logical channel served by the Broadcast Physical Layer packet.

DCPDROffset and the in-use pilot-to-data-ratio (PDR) parameters of the logical channel served by the Broadcast Physical Layer packet as defined below.

ModulationLayer of the logical channel served by the Broadcast Physical Layer packet.

Regarding Pilot-to-Data Power Ratio (PDR) parameters, the term in-use pilot-to-data-ratio (PDR) parameters of a logical channel associated with the Forward Broadcast and Multicast Services Channel can be represented by 4-bits and interpreted as follows:

Let Z be the value of the 4-bit representation of a parameter when interpreted as an unsigned integer. Then, the value of the parameter in dB is obtained as $0.5 \times (Z-4)$. For example, a value of $-2$ dB is represented as '0000' and a value of 5.5 dB is represented as '1111'.

The default Pilot-to-data Ratios for the Broadcast Overhead Channel associated with the appropriate transmission formats are specified in Table 3.

TABLE 3

Default Pilot to Data Ratio of the Broadcast Overhead Channel

| BOC-Transmission-Format | PDRBOCDefault (dB) |
|---|---|
| 0 | 2 |
| 1 | 2 |

For each logical channel associated with the Forward Broadcast and Multicast Services Channel, the access network can determine the values of the default PDR parameters as follows. The access network determines the values of the default Pilot-to-Data Ratios of each logical channel based on the BCMCS Transmission Format of that logical channel according to Table 4. The pilot-to-data ratio for the first two transmissions is denoted by BCMCSPilotToDataRatio, and may be different from the third transmission, which is denoted by PilotToDataRatio.

TABLE 4

Default Pilot to Data Ratio of the Broadcast messages

| BCMCS-Transmission-Format | PDRDataDefault (dB) |
|---|---|
| 0 | 2 |
| 1 | 2 |
| 2 | 2 |
| 3 | 2 |
| 4 | 2 |
| 5 | 2 |
| 6 | 2 |
| 7 | 2 |
| 8 | 2 |
| 9 | 2 |
| 10 | 2 |
| 11 | 2 |
| 12 | 2 |
| 13 | 2 |
| 14 | 2 |
| 15 | 2 |
| 16 | 2 |

The BroadcastChannelInfo message, further described below, carries information to indicate the in-use PDR parameters of logical channels. The access terminals receiving broadcast content monitor the BroadcastChannelInfo message. Other access terminals may ignore this message. For each logical channel associated with the Broadcast and Multicast Services Channel, the access network can set the value of a 1-bit parameter called BCMCSPDRProvidedForThisLogicalCh as follows:

TABLE 5

Broadcast Overhead Message

| Field | Length (bits) |
|---|---|
| MessageID | 8 |
| BCISignature | 16 |
| NumLogicalChannels | 8 |
| NumLogicalChannels occurrences of the following two fields: | |
| StartLocationj | 8 |
| Durationj | 4 |

| | |
|---|---|
| MessageID | The access network can set this field to 0x01. |
| BCISignature | The access network can set this field to the Signature of the corresponding BroadcastChannelInfo message. |
| NumLogicalChannels | The access network can set this field to the number of logical channels indexed by the Broadcast Overhead Message. |
| StartLocationj | The access network can set this field to the starting location of logical channel j in number of PhysicalResourcesi. |
| Durationj | The access network can set this field to the number of number of consecutive BCMCS subbands that the logical channel j occupies as specified in Table 6. |

If the BCMCS Transmission Format of the logical channel consists of a span of two or less, the access network can set the BCMCSPDRProvidedForThisLogicalCh parameter as follows:

The access network can set the BCMCSPDRProvidedForThisLogicalCh parameter to '0' if the value of BCMCSPilotToDataRatio is the same as the value of PDRDataDefault.

Otherwise, the access network can set the BCMCSPDRProvidedForThisLogicalCh parameter to '1'.

If the BCMCS Transmission Format of the logical channel consists of a span of 3, the access network can set the BCMCSPDRProvidedForThisLogicalCh parameter as follows:

If all of the following conditions are true, the access network can set the BCMC SPDRProvidedForThisLogicalCh parameter to '0':

The value of BCMCSPilotToDataRatio is the same as the value of PDRDataDefault for the first two transmissions.

The value of PilotToDataRatio is the same as the value of PDRDataDefault for the third transmissions.

Otherwise, the access network can set the BCMCSPDRProvidedForThisLogicalCh parameter to '1'.

For every Broadcast Physical Layer packet, the Broadcast MAC Protocol can provide a MAC Index to the Broadcast Physical Layer Protocol. The Broadcast MAC Protocol can set the MAC Index to $N_{BroadcastGenericMACIndex}$.

The BroadcastOverhead message, further described below, carries information to indicate the in-use PDR parameters of logical channels. The access network sends the BroadcastOverhead message to provide the access terminal with the mapping between logical channels and starting BCMCS subband on the Broadcast and Multicast Services Channel. The format of the Broadcast Overhead message is illustrated in Table 5.

TABLE 6

Description of the Durationj Field, where j is the Index of the Logical Channel

| Durationj | Burst Length (BCMCS subbands) |
|---|---|
| '0000' | 1 |
| '0001' | 2 |
| '0010' | 3 |
| '0011' | 4 |
| '0100' | 6 |
| '0101' | 8 |
| '0110' | 9 |
| '0111' | 12 |
| '1000' | 16 |
| '1001' | 20 |
| '1010' | 24 |
| '1011' | 32 |
| '1100' | 36 |
| '1101' | 48 |
| '1110' | 60 |
| '1111' | 64 |

The access network sends the BroadcastChannelInfo message to provide the access terminal with the mapping between logical channels and Broadcast Physical Channels. The format of the Broadcast ChannelInfo message is illustrated in Table 7.

TABLE 7

Broadcast ChannelInfos Message

| Field | Length (bits) |
|---|---|
| MessageID | 8 |
| ProtocolSubtype | 8 |
| BroadcastChannelInfoSignature | 16 |
| QCISignature | 20 |
| AllReservedInterlaces | 4 |
| BCMCSReservedInterlaces | 0 or 4 |
| NumBOC | 2 |

TABLE 7-continued

Broadcast ChannelInfos Message

| Field | Length (bits) |
|---|---|
| NumBOC occurrences of the following fields: | |
| BCMCSFlowIDLength | 2 |
| BCMCSOverheadFields | Variable Length |
| Reserved | 0-7 (as needed) |

| | |
|---|---|
| MessageID | The access network can set this field to 0x00. |
| ProtocolSubtype | The access network can set this field as appropriate. |
| BroadcastChannelInfoSignature | The access network can change this field if any of the other fields in the BroadcastChannelInfo message changes. |
| QCISignature | The access network can set this field to the QCISignature public data of the Overhead Messages protocol. |
| AllReservedInterlaces | The access network can set this field to '1' the indicate that all the subbands of all the reserved interlaces are being used for BCMCS, else the access network can set this field to '0'. |
| BCMCSReservedInterlaces | If the AllReservedInterlace field is set to '1', then the access network can omit this field. Otherwise, the access network can include this field and set it according to Table 8. All the subbands in these interlaces can be used for BCMCS. |

TABLE 8

Interpretation of BCMCSReservedInterlaces

| Value | Reserved BCMCS Interlaces |
|---|---|
| 0000 | 0 |
| 0001 | 0, 1 |
| 0010 | 0, 1, 2 |
| 0011 | 0, 1, 2, 3 |
| 0100 | 0, 1, 2, 3, 4 |
| 0101 | 0, 1, 2, 3, 4, 5 |
| 0110 | 0, 1, 2, 3, 4, 5, 6 |
| 0111 | 3 |
| 1000 | 6 |
| 1001 | 0, 2 |
| 1010 | 0, 4 |
| 1011 | 0, 6 |
| 1100 | 2, 4 |
| 1101 | 2, 6 |
| 1110 | 4, 6 |
| 1111 | 2, 4, 6 |

| | |
|---|---|
| NumBOC | The access network can set this field to indicate the number of different Broadcast Overhead Channels (and hence Physical Channel groups) present in each BCMCS ultraframe. |
| BCMCSFlowIDLength | The access network can set this field to one less than the length of the BCMCS Flow Identifier in units of octets. The access network can not set this field to '00'. |
| BCMCSOverheadFields | The access network can include this field if the BCMCSOverheadFieldsIncluded field is included and set to '1'. Otherwise, the access network can omit this field. If included the access network can set this as defined in Table 9. This field specifies the logical to physical channel mapping for the logical channels transmitted on the Forward Broadcast and Multicast Services Channel. |
| Reserved | The access network can add reserved bits in order to make the length of the entire message equal to an integer number of octets. The access network can set these bits to '0'. The access terminal can ignore these bits. |

TABLE 9

BCMCS Overhead Fields

| BCMCSFlowCount | 8 |
|---|---|
| NumOuterframes | 2 |
| NumOffsets | 4 |
| BOCTransmissionFormat | 0 or 3 |
| BOCPDRParametersIncluded | 0 or 1 |
| BOCPilotToDataRatioRecord | 0 or Variable |
| FDSSeedNumMSBs | 0 or 4 |
| FDSSeedMSBs | 0 or FDSSeedNumMSBs |

TABLE 9-continued

BCMCS Overhead Fields

| NumOffsets occurrences of the following fields: | |
|---|---|
| Offsetj | 4 |
| Periodj | 4 |
| BCMCSFlowCount occurrences of the following variable-length record: | |
| BCMCSFlowID | (BCMCSFlowIDLength + 1) × 8 |
| RegisterForPaging | 1 |
| RegisterForDynamicBroadcast | 1 |
| LogicalChannel-SameAsPreviousBCMCSFlow | 1 |
| Zero or one occurrence of the following nine fields | |
| StartLocation | 8 |
| Duration | 4 |
| BCMCSTransmissionFormat | 0 or 6 |
| OuterCode | 0 or 4 |
| Period | 0 or 2 |

TABLE 9-continued

BCMCS Overhead Fields

| | |
|---|---|
| PilotStaggerIndex | 0 or 3 |
| BCMCSPilotToDataRatioRecord | 0 or Variable |
| FDSSeedSameAsPreviousLogCh | 0 or 1 |
| FDSSeedLSBs | 0 or 10-FDSSeedNumMSBs |
| ModulationLayer | 0 or 1 |

| | |
|---|---|
| BCMCSFlowCount | The access network can set this field to the number of BCMCS Flow identifiers included in the BCMCSOverheadFields field of this message. |
| NumOuterframes | The access network can set this field to the number of outerframes per ultraframe as indicated in Table 10 |
| NumOffsets | The access network can set this field to the number of offsets that the assigned to the outerframes as described above. |
| BOCTransmissionFormat | The access network can set this field to the packet format index of the Broadcast Overhead Channel as specified above. |
| BOCPDRParametersIncluded | If the BCMCSFlowCount field is set to zero, the access network can omit this field. Otherwise, the access network can include this field and set it as follows: If the pilot to data ratio of the Broadcast Overhead Channel is not the same as PDRBOCDefualt, then the access network can set this field to '1'. Otherwise, the access network can set this field to '0'. |
| BOCPilotToDataRecord | If LogicalChannelSameAsPreviousBCMCSFlow is set to '1', or if the BOCPDRParametersIncluded field is set to '0', then the access network can omit this field. Otherwise, the access network can include this field and set it according to Table 13. |
| FDSSeedNumMSBs | If BCMCSFlowCount field is set to zero, the access network can omit this field. Otherwise, the access network can include this field and set it to the unsigned binary representation of a value between 0 to 10, inclusive, to indicate the length of the FDSSeedMSBs field. FDSSeedNumMSBs can be such that the FDSSeedNumMSBs MSBs of the 10-bit FDSSeed parameters of all logical channels defined after this field for which PhysicalChannelCount is greater than zero can be the same. |
| FDSSeedMSBs | If BCMCSFlowCount field is set to zero, the access network can omit this field. Otherwise, the access network can include this field and set it to the common FDSSeedNumMSBs MSBs of the FDSSeed parameters of all logical channels defined after this field for which the PhysicalChannelCount is greater than zero. |
| Offsetj | The access network can set this field to the value offsetj - 1 as described above. |
| Periodj | The access network can set this field to the value periodj - 1 as as described above. |
| BCMCSFlowID | The access network can set this field to the BCMCS Flow identifier of this BCMCS Flow. |
| RegisterForPaging | The access network can set this field to '1' if the access terminal is required to include this BCMCS Flow in a BCMCSFlowRegistration message to allow the access network to send messages to the access terminal on the appropriate channel(s). Otherwise, the access network can set this field to '0'. |
| RegisterForDynamicBroadcast | The access network can set this field to '1' if the access terminal is required to include this BCMCS Flow in a BCMCSFlowRegistration message to allow the access network to dynamically assign and de-assign BCMCS Flows to physical channels. Otherwise, the access network can set this field to '0'. |

TABLE 10

Description of NumOuterframes Field

| NumOuterframes field | Number of outerframes per ultraframe |
|---|---|
| '00' | 1 |
| '01' | 2 |
| '10' | 4 |
| '11' | 8 |

-continued

| | |
|---|---|
| LogicalChannelSameAsPreviousBCMCSFlow | If this BCMCS Flow is transmitted using the same logical channel as the previous BCMCS Flow listed in the BCMCSOverheadFields field of this message, then the access network can set this field to '1'. Otherwise, the access network can set this field to '0'. If this is the first BCMCS Flow listed in the BCMCSOverheadFields field of this message, then the access network can set this field to '0'. |

Records for all BCMCS Flow IDs that share the same logical channel can be placed consecutively in the BroadcastChannelInfo message.

| | |
|---|---|
| Start Location | The access network can set this field to the starting location of the logical channel in number of PhysicalResourcesi. |
| Duration | The access network can set this field to the number of number of consecutive BCMCS subbands that the logical channel occupies as specified in Table 6. |
| BCMCSTransmissionFormat | If LogicalChannelSameAsPreviousBCMCSFlow is set to '1', then the access network can omit this field. Otherwise, the access network can set this field to the TransmissionFormat parameter of this logical channel according to Table 2 to indicate the Broadcast transmission format of this logical channel. |
| Period | If LogicalChannelSameAsPreviousBCMCSFlow field is set to '1', then the access network can omit this field. Otherwise, the access network can set this field to the 2-bit representation of the Period parameter associated with this logical channel as shown in Table 11. |

TABLE 11

Description of Period Field

| Period Field | Number of Transmissions |
|---|---|
| '000' | 1 |
| '001' | 2 |
| '010' | 3 |
| '011' | Reserved |

| | |
|---|---|
| OuterCode | If LogicalChannelSameAsPreviousBCMCSFlow is set to '1', or if PhysicalChannelCount is zero, then the access network can omit this field. Otherwise, the access network can set this field to indicate which Reed-Solomon outercode is used to form an error control block for this logical channel according to Table 12. |

TABLE 12

Description of OuterCode Field

| OuterCode | (N, K, R) Reed-Solomon outercode |
|---|---|
| '0000' | (1, 1, 0) Reed-Solomon code (No outercode) |
| '0001' | (16, 12, 4) Reed-Solomon code |
| '0010' | (16, 13, 3) Reed-Solomon code |
| '0011' | (16, 14, 2) Reed-Solomon code |
| '0100' | (32, 24, 8) Reed-Solomon code |
| '0101' | (32, 26, 6) Reed-Solomon code |
| '0110' | (32, 28, 4) Reed-Solomon code |

All other values are reserved

| | |
|---|---|
| PilotStaggerIndex | If LogicalChannelSameAsPreviousBCMCSFlow is set to '1', or if PhysicalChannelCount is zero, then the access network can omit this field. Otherwise, the access network can set this field to indicate the content dependent PilotStagger parameter according to Table 13. For different contents broadcast at the same time the access network should assign different PilotStaggerIndex. |

TABLE 13

Description of PilotStaggerIndex Field

| PilotStaggerIndex | PilotStagger |
|---|---|
| '000' | 0 |
| '001' | 1 |
| '010' | 2 |
| '011' | 3 |
| '100' | 4 |
| '101' | 5 |
| '110' | 6 |
| '111' | 7 |

| | |
|---|---|
| BCMCSPilotToDataRatioRecord | If LogicalChannelSameAsPreviousBCMCSFlow is set to '1', or if PhysicalChannelCount is zero, or if the BCMCSPDRParametersIncluded field is set to '0', then the access network can omit this field. Otherwise, the access network can include this field and set it according to Table 14. |
| FDSSeedSameAsPreviousLogCh | If LogicalChannelSameAsPreviousBCMCSFlow is set to '1', or if PhysicalChannelCount is zero, or if (10 - FDSSeedNumMSBs) is zero, the access network can omit this field. Otherwise, the access network can include this field and set it as follows: If there exists an occurrence of a non-empty FDSSeedLSBs field prior to this field and the last such occurrence is set equal to the (10 - FDSSeedMSBs) LSBs of the FDSSeed parameter of this logical channel, then the access network can set this field to '1'. Otherwise, the access network can set this field to '0'. |
| FDSSeedLSBs | If the FDSSeedSameAsPreviousLogCh is included and set to '0', the access network can include this field and set it to the (10 - FDSSeedNumMSBs) LSBs of the FDSSeed parameter for this logical channel. Otherwise, the access network can omit this field. |
| ModulationLayer | If the logical channel is transmitted on the base layer, the access network can set this field to '0'. If the logical channel is transmitted on the enhancement layer, the access network can set this field to '1'. |

TABLE 14

BCMCSPilotToDataRatioRecord

| Field | Length (bits) |
|---|---|
| BCMCSPDRProvidedForThisLogicalCh | 1 |
| BCMCSPDRSameAsBefore | 0 or 1 |
| BCMCSPilotToDataRatio | 0 or 4 |
| PilotToDataRatio | 0 or 4 |

Regarding the Broadcast MAC NextUltraframeInfo format, the access network places the following fields at the end of every Broadcast MAC packet:

| Field | Length (bits) |
|---|---|
| StartBCMCSSubbandNumber | 8 |
| LndBCMCSSubbandNumber | 8 |
| ReadBroadcastChannelInfo | 1 |
| Reserved | 7 |

| | |
|---|---|
| BCMCSPDRProvidedForThisLogicalCh | The access network can set this field to '1' if the pilot to data ratio of the Broadcast packet is different from the PDRDataDefault. |
| BCMCSPDRSameAsBefore | If the BCMCSPDRProvidedForThisLogicalCh field is set to '0', the access network can omit this field. Otherwise, the access network can include this field and set it as follows: If the BCMCSOverheadFields field of the BroadcastChannelInfo message specifies at least one logical channel prior to this logical channel which includes a non-empty BCMCSPDRRecordForThisLogicalCh field and has the same BCMCS Transmission Format as this logical channel, and if the last one of such logical channels has the same values for all in-use pilot-to-data-ratio parameters described above, as this logical channel, then the access network can set this field to '1'. Otherwise, the access network can set this field to '0'. |
| BCMCSPilotToDataRatio | The access network can set this field as described above. The method by which the access network sets the BCMCSPilotToDataRatio parameter is beyond the scope of this specification. |
| PilotToDataRatio | The access network can set this field as described above. The method by which the access network sets the PilotToDataRatio parameter is beyond the scope of this specification. |

| | |
|---|---|
| StartBCMCSSubbandNumber | The access network can set this field to the location of the first BCMCS subband of the logical channel in the next ultraframe. If the logical channel is not present in the next ultraframe, the access network can set this field to NULL. |
| EndBCMCSSubbandNumber | The access network can set this field to the location of the last BCMCS subband of the logical channel in the next ultraframe. If the logical channel is not present in the next ultraframe, the access network can set this field to NULL. |
| ReadBroadcastChannelInfo | The access network can set this field to '0' if the parameters broadcast on the BroadcastChannelInfo has not changed. The access network can set this field to '1' if the parameters broadcast on the BroadcastChannelInfo can change on the next instance of the BroadcastChannelInfo. |
| Reserved | The access network can set these bits to '0'. |

The transmission techniques described herein may be implemented by various means. For example, these techniques may be implemented in hardware, firmware, software, or a combination thereof. For a hardware implementation, the processing units at a transmitter may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units at a receiver may also be implemented within one or more ASICs, DSPs, processors, and so on.

For a software implementation, the transmission techniques may be implemented with instructions (e.g., procedures, functions, modules, software codes, and so on) that perform the functions described herein. The instructions or software codes may be stored in a memory (e.g., memory 832 or 872 in FIG. 2) and executed by a processor (e.g., processor 830 or 870). The memory may be implemented within the processor or external to the processor.

It should be noted that the concept of channels herein refers to information or transmission types that may be transmitted by the access point or access terminal. It does not require or utilize fixed or predetermined blocks of subcarriers, time periods, or other resources dedicated to such transmissions.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of processing broadcast messages received over a wireless channel, the method comprising:
   receiving a plurality of signals;
   determining which of the signals corresponds to at least one broadcast message designated by a subband and orthogonal frequency division multiplexing (OFDM) symbols of frames in which signals are received; and
   determining an order of a plurality of broadcast messages within an interlace of a physical layer frame, when the at least one broadcast message includes the plurality of broadcast messages in the same physical layer frame, wherein the order of the plurality of broadcast messages in the physical layer frame increases for each interlace of the physical layer frame, and wherein the physical layer frame that occurs earlier in time is numbered lower.

2. The method of claim 1, wherein determining which of the signals corresponds to at least one broadcast message comprises determining the subband according to hop ports assigned in an overhead message.

3. The method of claim 2, wherein the hop ports are advertised in the overhead message.

4. The method of claim 1, wherein the subband is indexed.

5. The method of claim 1, wherein determining which of the signals corresponds to at least one broadcast message comprises determining a frame wherein the OFDM symbols comprise a last one, two, four or eight OFDM symbols of each outerframe.

6. The method of claim 1, further comprising:
   providing a plurality of subbands over a Forward Broadcast and Multicast Services Channel.

7. The method of claim 6, wherein a number of the plurality of subbands is provided in a Broadcast Channel Info message.

8. The method of claim 6, wherein the broadcast messages in the Forward Broadcast and Multicast Services Channel are provided over flows, and the flows are transmitted over logical channels.

9. The method of claim 1, wherein when more than one subband is present in the physical layer frame, further comprising: ordering the subbands in increasing order.

10. The method of claim 1, wherein the physical layer frame further comprising superframes, and the broadcast messages are indexed in terms of ultraframes.

11. The method of claim 10, wherein each ultraframe comprises a number of subzones and interlaces of superframes.

12. The method of claim 1, further comprising determining the order of the plurality of broadcast messages within each of a plurality of non-consecutive interlaces of the physical layer frame.

13. An apparatus for processing broadcast messages received over a wireless channel, the apparatus comprising:
   means for receiving a plurality of signals;
   means for determining which of the signals corresponds to at least one broadcast message designated by a subband and orthogonal frequency division multiplexing (OFDM) symbols of frames in which signals are received; and
   means for determining an order of a plurality of broadcast messages within an interlace of a physical layer frame, when the at least one broadcast message includes the plurality of broadcast messages in the same physical layer frame, wherein the order of the plurality of broadcast messages in the physical layer frame increases for each interlace of the physical layer frame, and wherein the physical layer frame that occurs earlier in time is numbered lower.

14. The apparatus of claim 13, wherein the means for determining which of the signals corresponds to at least one broadcast message comprises means for determining the subband according to hop ports assigned in an overhead message.

15. The apparatus of claim 14, wherein the hop ports are advertised in the overhead message.

16. The apparatus of claim 13, wherein the subband is indexed.

17. The apparatus of claim 13, wherein the means for determining which of the signals corresponds to at least one broadcast message comprises means for determining a frame wherein the OFDM symbols comprise a last one, two, four or eight OFDM symbols of each outerframe.

18. An apparatus for processing broadcast messages received over a wireless channel, the apparatus comprising:
a receiver configured to receive a plurality of signals; and
a processor configured to determine which of the signals corresponds to at least one broadcast message designated by a subband and orthogonal frequency division multiplexing (OFDM) symbols of frames in which signals are received, and configured to determine an order of a plurality of broadcast messages within an interlace of a physical layer frame, when the at least one broadcast message includes the plurality of broadcast messages in the same physical layer frame, wherein the order of the plurality of broadcast messages in the physical layer frame increases for each interlace of the physical layer frame, and wherein the physical layer frame that occurs earlier in time is numbered lower.

19. A non-transitory processor-readable medium including processor-executable instructions thereon for performing a method of processing broadcast messages received over a wireless channel, the method comprising the steps of:
receiving a plurality of signals;
determining which of the signals corresponds to at least one broadcast message designated by a subband and orthogonal frequency division multiplexing (OFDM) symbols of frames in which signals are received; and
determining an order of a plurality of broadcast messages within an interlace of a physical layer frame, when the at least one broadcast message includes the plurality of broadcast messages in the same physical layer frame, wherein the order of the plurality of broadcast messages in the physical layer frame increases for each interlace of the physical layer frame, and wherein the physical layer frame that occurs earlier in time is numbered lower.

20. The non-transitory processor-readable medium of claim 19, wherein the processor-executable instructions for determining which of the signals corresponds to at least one broadcast message comprise determining the subband according to hop ports assigned in an overhead message.

21. The non-transitory processor-readable medium of claim 20, wherein the hop ports are advertised in the overhead message.

22. The non-transitory processor-readable medium of claim 19, wherein the subband is indexed.

23. The non-transitory processor-readable medium of claim 19, wherein the processor-executable instructions for determining which of the signals corresponds to at least one broadcast message comprises processor-executable instruction for determining a frame wherein the OFDM symbols comprise a last one, two, four or eight OFDM symbols of each outerframe.

* * * * *